Feb. 23, 1937. H. G. MARTIN 2,072,056
APPARATUS FOR TESTING EYES
Filed Feb. 6, 1935 2 Sheets-Sheet 1

Inventor,
Hilmar G. Martin

Feb. 23, 1937. H. G. MARTIN 2,072,056
APPARATUS FOR TESTING EYES
Filed Feb. 6, 1935 2 Sheets-Sheet 2

| Pd. in. mm. | 11.0 | 11.5 | 12.0 | 13.0 | 14.0 | 15.0 | 16.0 | 17.0 | 18.0 | 19.0 | 20.0 | 21.0 |
|---|---|---|---|---|---|---|---|---|---|---|---|---|
| 56 | 8.0 | 7.63 | 7.36 | 6.81 | 6.36 | 5.9 | 5.45 | 5.18 | 4.8 | 4.63 | 4.36 | 4.18 |
| 57 | 8.18 | 7.81 | 7.45 | 6.9 | 6.4 | 6.0 | 5.6 | 5.27 | 4.9 | 4.72 | 4.45 | 4.27 |
| 58 | 8.36 | 7.95 | 7.54 | 7.09 | 6.5 | 6.99 | 5.72 | 5.36 | | | | |
| 59 | 8.45 | 8.09 | 7.72 | 7.18 | 6.63 | 6.18 | | | | | | |
| 60 | 8.63 | 8.27 | 7.90 | 7.27 | 7.72 | | | | | | | |
| 61 | 8.72 | 8.40 | 8.04 | 7.36 | 6.81 | | | | | | | |
| 62 | 8.90 | 8.54 | 8.18 | 7.54 | | | | | | | | |
| 63 | 9.0 | 8.68 | 8.36 | 7.63 | | | | | | | | |
| 64 | 9.18 | 8.81 | 8.45 | 7.81 | | | | | | | | 4.81 |
| 65 | 9.36 | 8.90 | 8.54 | 7.9 | | | | | | | 5.13 | 4.86 |
| 66 | 9.54 | 9.13 | 8.72 | 8.0 | | | | | | | 5.5 | 5.18 | 4.9 |
| 67 | 9.63 | 9.22 | 8.90 | 8.09 | | | | | | | 5.54 | 5.27 | 5.0 |
| 68 | 9.81 | 9.36 | 9.0 | 8.27 | | | | | 5.9 | 5.63 | 5.36 | 5.09 |

Inventor
Hilmer G. Martin
By
Attorney

Patented Feb. 23, 1937

2,072,056

UNITED STATES PATENT OFFICE 2,072,056

APPARATUS FOR TESTING EYES

Hilmar G. Martin, Milwaukee, Wis., assignor to The Medical Society of Milwaukee County, Milwaukee, Wis., a corporation of Wisconsin Application February 6, 1935, Serial No. 5,169

3 Claims. (Cl. 88—20)

This invention relates to the art of optometry and has as an object to provide an improved and simplified apparatus or instrument for quickly and accurately determining the angle of convergence of a patient's eyes.

More specifically it is an object of this invention to provide an apparatus or instrument which combines in a single unit means for measuring the interpupillary distance and the distance of maximum convergence.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which.

Referring now more particularly to the accompanying drawings in which like numerals indicate like parts throughout the several views, the numeral 5 designates a longitudinal rail or supporting bar, one side of which is provided with a scale 6 graduated in centimeters. At one end of the rail or bar 5 there is an upwardly inclined end portion 7. Both the bar 5 and the upwardly inclined end portion 7 are preferably hollow for the sake of lightness.

Figure 1:
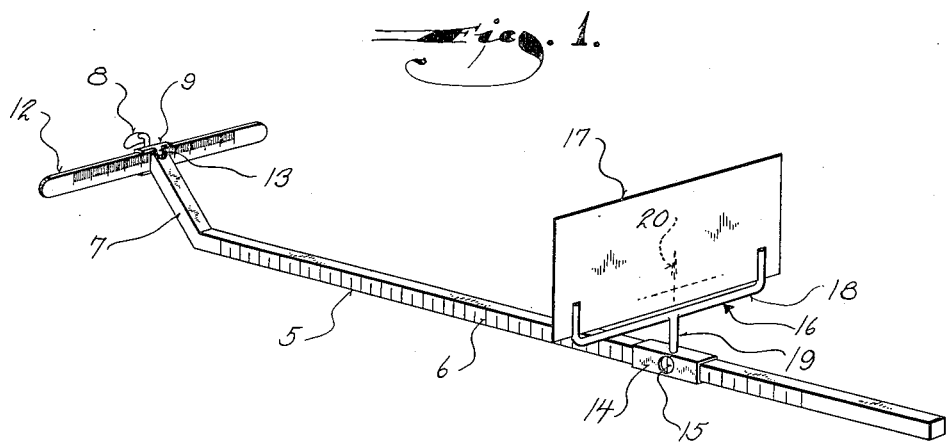
Figure 1 is a perspective view of an apparatus embodying this invention.
Figure 2:
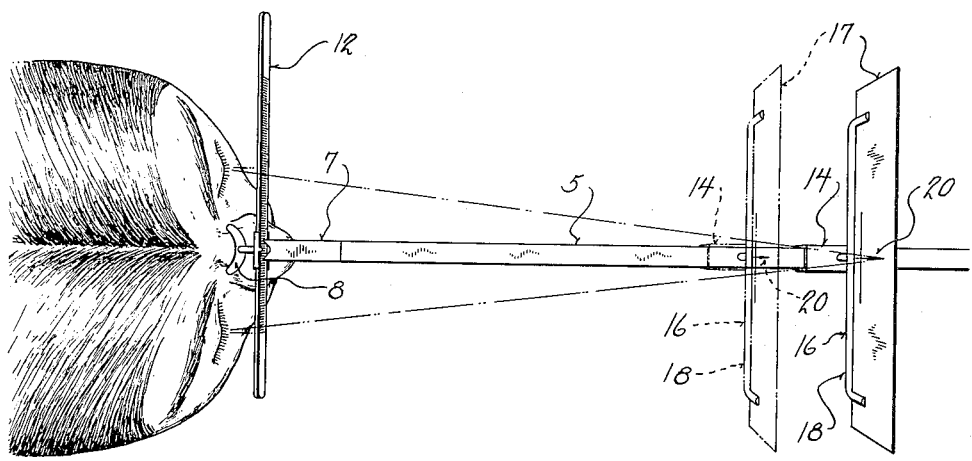
Figure 2 is a perspective top view showing the manner of using the invention.
Figures 3, 4, 5:
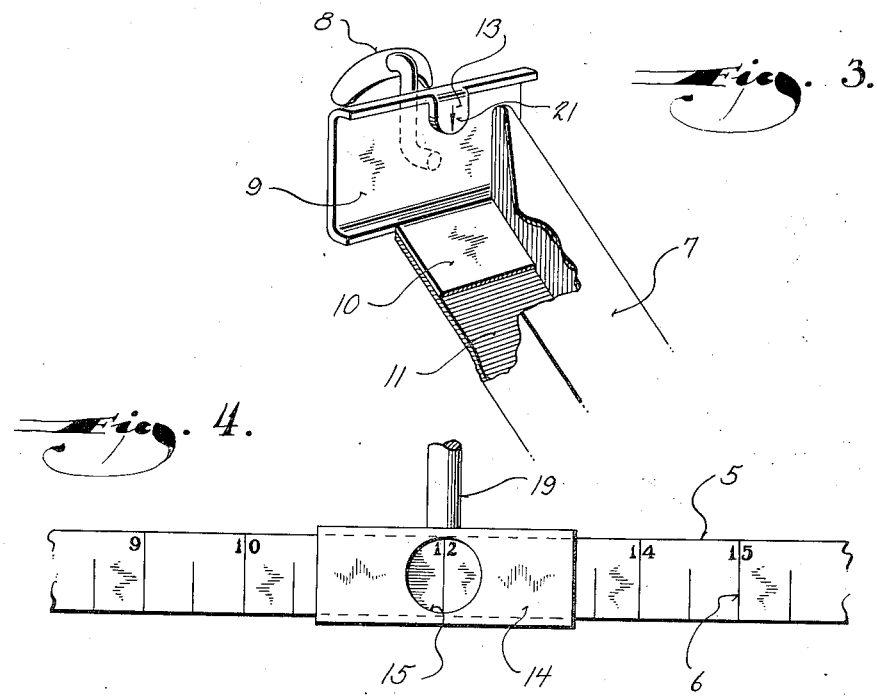
Figure 3 is a perspective view showing a detail of construction.
Figure 4 is an enlarged side view of a portion of the apparatus.
Figure 5 shows a chart used in conjunction with the apparatus.

Mounted at the extremity of the inclined end portion 7 is a nose piece or rest 8, the manner of its attachment to the inclined end portion being shown in detail in Figure 3. As here shown, the rest or nose piece 8 is fixed to a channel guideway or holder 9 which is secured to the adjacent upper end of the inclined portion 7 by a lip or flange 10 brazed or otherwise fixed to its bottom wall 11.

This channel guideway or holder 9 slidably receives a short scale or rule 12 graduated in millimeters and readily slidable back and forth. A tongue 13 projecting down from the upper flange of the channel guideway serves to hold the scale or rule 12 in the guideway.

Slidable on the longitudinal rail or bar 5 is a sleeve 14 having a hole 15 in one side wall through which the graduations and numerical designations of the scale 6 may be seen to determine the position of the sleeve on the bar 5. Projecting up from the sleeve 14 and in line with the axis of the opening 15 is a support 16 for a card 17. This support is conveniently formed of heavy gauge wire and comprises a yoke portion 18, the upstanding side arms of which are slitted to receive the card, and a foot 19 projecting down from the center of the yoke by which it is secured to the sleeve.

Drawn on that side of the card 17 facing the nose piece or rest 8 is an object in the form of an arrow 20 upon which the patient's gaze is fixed during use of the instrument.

In use, the examiner, seated directly in front of the patient, places the nose piece 8 of the instrument in place so that the arrow on the test card is on a level with the patient's line of vision. Then by means of the millimeter scale or rule 12 the interpupillary distance is read. The total distance between the pupillary centers can be read off directly or if it is desired to consider each eye separately, the distance between the pupillary center of one eye and the mid-point of the instrument, conveniently designated by an arrow 21 on the tongue 13, can be read off by moving the rule to the right or left in its channel guideway.

The patient is then directed to fix his gaze on the arrow delineated on the test card and with the slide 14 carrying the card positioned well toward the outer end of the bar 5, the slide is slowly moved toward the patient. The patient keeps his gaze fixed upon the arrow 20 so that as the card is moved toward the patient, the lines of vision of the eyes converge, the angle of convergence becoming steeper as the card nears the eyes.

The patient is directed to signify when the arrow appears double and at the instant this occurs, the forward motion of the sleeve and card is arrested. The position of the card at this time, read on the centimeter scale 6, represents the distance of maximum convergence of the eyes.

If it is desired to consider this distance from the centers of rotation, fourteen millimeters are added to the figure determined on the centimeter scale by the then position of the card.

From a determination of this distance of maximum convergence and the ascertained interpupillary distance, the convergence of the patient's eyes in terms of meter angles can be determined.

To aid in this determination and preclude the necessity of painstaking calculations, a chart such as shown in Figure 5 is provided. On this chart the interpupillary distances are shown in the left hand column, reading vertically, while the distances of the test object from the eye as read on the centimeter scale 6, are shown across the top of the chart, reading horizontally.

The figures at the intersections of the vertical and horizontal columns on the chart indicate in meter angles the greatest amount of convergence of which the patient is capable. Comparing this figure with that representing the convergence in constant use for the patient's close work determines the amount of reserve convergence and enables the examiner to prescribe proper lenses.

As an example, assuming that the interpupillary distance is 60 millimeters and the near point of convergence, as read on the centimeter scale 6 of the instrument, is determined as 13.0 centimeters. Finding these figures on the chart, it will be seen that the greatest amount of convergence which these figures represent designated in meter angles is 7.27.

From the foregoing description taken in connection with the accompanying drawings, it will be readily apparent to those skilled in the art to which this invention appertains, that this invention provides simplified means for quickly and accurately determining the maximum convergence of a patient's eyes.

What I claim as my invention is:

1. An instrument of the character described comprising a longitudinal supporting bar, means at one end of the supporting bar engageable with the nose of a patient to definitely locate the bar with respect to the patient's eyes, a scale holder carried by the bar adjacent the means engageable with the patient's nose for slidably supporting a scale for movement transversely with respect to the bar to enable direct determination in accepted units of measurement of the interpupillary distance of a patient's eyes, a support slidable on the bar toward and away from the patient's eyes, means carried by said support to mount a test object upon which the gaze of the patient's eyes may be fixed, and a scale for directly determining the position of the test object with respect to the bar and consequently the distance thereof from the patient's eyes in units of measurement related to those used for the determination of the interpupillary distance.

2. An instrument of the character described comprising a longitudinal supporting bar, an upwardly inclined end portion on the bar, a scale holder carried by the upper end of said inclined end portion to hold a scale for transverse sliding movement with respect to the supporting bar whereby the interpupillary distance of the patient's eyes in accepted units of measurement may be directly determined, a nose piece at said upper end of the inclined end portion engagable with the nose of the patient to definitely locate the scale holder and the supporting bar with respect to the eyes of the patient, a sleeve slidable along said supporting bar toward and away from the patient's eyes, means on said sleeve to mount a test object in line with the vision of the patient, and scale means on the bar for determining the distance of the test object from the eyes at the point of maximum convergence of the patient's eyes, whereby from the determined interpupillary distance of the patient's eyes and the distance from the patient's eyes to the point of maximum convergence, the greatest amount of convergence of which the patient is capable in terms of meter angles may be calculated.

3. An instrument of the character described comprising a longitudinal bar of the same polygonal cross section throughout its entire length, one end portion of said bar being bent upwardly at an angle so as to dispose the adjacent extremity of the bar above the level of its main longitudinal portion, a nose piece carried by said extremity of the bar engageable with the bridge of the nose of the patient to definitely locate the bar with respect to the eyes of the patient, a transverse guideway also carried by said extremity of the bar so as to be located in juxtaposition to the nose piece, said guideway being adapted to mount a scale for transverse sliding movement directly beneath the eyes of the patient, a sleeve slidable along the main longitudinal portion of the bar, said sleeve fitting a cross sectional shape of the bar so as to be held against rotation thereby, means on said sleeve to mount a test object for movement toward and from the eyes upon sliding said sleeve along the bar, and a scale on the main longitudinal portion of the bar cooperable with a part on the sleeve to determine the location of the test object from the patient's eyes.

HILMAR G. MARTIN.